(12) United States Patent
Yamasaki et al.

(10) Patent No.: US 12,255,558 B2
(45) Date of Patent: Mar. 18, 2025

(54) MOTOR CONTROLLER, MOTOR SYSTEM AND METHOD FOR CONTROLLING MOTOR

(71) Applicant: MINEBEA MITSUMI Inc., Nagano (JP)

(72) Inventors: Reiji Yamasaki, Nagano (JP); Toshiki Kimura, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 85 days.

(21) Appl. No.: 17/907,569

(22) PCT Filed: Mar. 23, 2021

(86) PCT No.: PCT/JP2021/011927
§ 371 (c)(1),
(2) Date: Sep. 28, 2022

(87) PCT Pub. No.: WO2021/200389
PCT Pub. Date: Oct. 7, 2021

(65) Prior Publication Data
US 2023/0142956 A1   May 11, 2023

(30) Foreign Application Priority Data

Mar. 31, 2020  (JP) ................. 2020-064146

(51) Int. Cl.
*H02P 21/13*  (2006.01)
*H02P 21/18*  (2016.01)

(52) U.S. Cl.
CPC .............. *H02P 21/13* (2013.01); *H02P 21/18* (2016.02)

(58) Field of Classification Search
CPC .. H02P 21/13; H02P 21/18; H02P 6/18; H02P 27/06; H02M 7/48
See application file for complete search history.

(56) References Cited

U.S. PATENT DOCUMENTS

2012/0211299 A1   8/2012  Yanai
2014/0055067 A1   2/2014  Kuroda et al.

FOREIGN PATENT DOCUMENTS

CN   102687386   9/2012
CN   103633909   3/2014
(Continued)

OTHER PUBLICATIONS

International Search Report for PCT/JP2021/011927 mailed on May 25, 2021.
(Continued)

*Primary Examiner* — Said Bouziane
(74) *Attorney, Agent, or Firm* — IPUSA, PLLC

(57) ABSTRACT

A motor controller includes an observer that estimates a γ-axis electromotive force and a δ-axis electromotive force, during an idle time of a rotor of a motor. The motor controller includes a derivation unit that derives a phase difference between dq axes and γδ axes, from the γ-axis electromotive force and the δ-axis electromotive force. The motor controller includes an estimation unit that estimates an idling state of the rotor from the phase difference. For example, the estimation unit estimates an idle velocity of the rotor from periodicity of the phase difference. For example, the estimation unit estimates a pole position of the rotor during the idle time, from the phase difference, a sign of the γ-axis electromotive force, and a sign of the δ-axis electromotive force.

13 Claims, 12 Drawing Sheets

(56) References Cited

FOREIGN PATENT DOCUMENTS

| | | |
|---|---|---|
| CN | 103733504 | 4/2014 |
| JP | 2007-166695 | 6/2007 |
| JP | 2017-099070 | 6/2017 |
| JP | 2018-170928 | 11/2018 |
| JP | 2018170928 A * | 11/2018 |
| JP | 2018-204878 | 12/2018 |
| JP | 2020-014266 | 1/2020 |

OTHER PUBLICATIONS

Office Action mailed on Jan. 9, 2025 with respect to the corresponding Chinese patent application No. 202180025934.9.

* cited by examiner

MOTOR CONTROLLER, MOTOR SYSTEM AND METHOD FOR CONTROLLING MOTOR

TECHNICAL FIELD

The present invention relates to a motor controller, a motor system, and a method for controlling a motor.

BACKGROUND

For techniques that detect pole positions of a rotor by a current detection system that uses one shunt, it is known to detect a pole position and a rotation speed of the rotor, by detecting an electromotive force that is generated due to idling of the rotor, which results from wind occurring prior to start-up of a motor (for example, Patent Document 1).

CITATION LIST

Patent Document

[Patent Document 1] Japanese Unexamined Patent Application Publication No. 2007-166695

SUMMARY

In many cases, when a stopped permanent-magnet synchronous motor is started, the pole position of a rotor magnet is detected using so-called inductive sensing to start the motor. However, in a state where the rotor is idling, it is difficult to estimate the pole position by the inductive sensing.

In the present disclosure, a motor controller, a motor system, and a method for controlling a motor that is capable of estimating an idling state, such as a pole position of a rotor during an idle time, are provided.

A motor controller according to one embodiment of the present disclosure includes a derivation unit configured to estimate a γ-axis electromotive force and a δ-axis electromotive force, during an idle time of a rotor of a motor, and to derive a phase difference between dq axes and γδ axes, from the γ-axis electromotive force and the δ-axis electromotive force. The motor controller includes an estimation unit configured to estimate an idling state of the rotor from the phase difference.

Effect of the Invention

According to the present disclosure, an idling state, such as a pole position of a rotor during idling, can be estimated.

DESCRIPTION OF EMBODIMENTS

A motor controller, a motor system, and a method for controlling a motor according to one or more embodiments of the present invention will be described below in detail with reference to the drawings.

Figure 1:
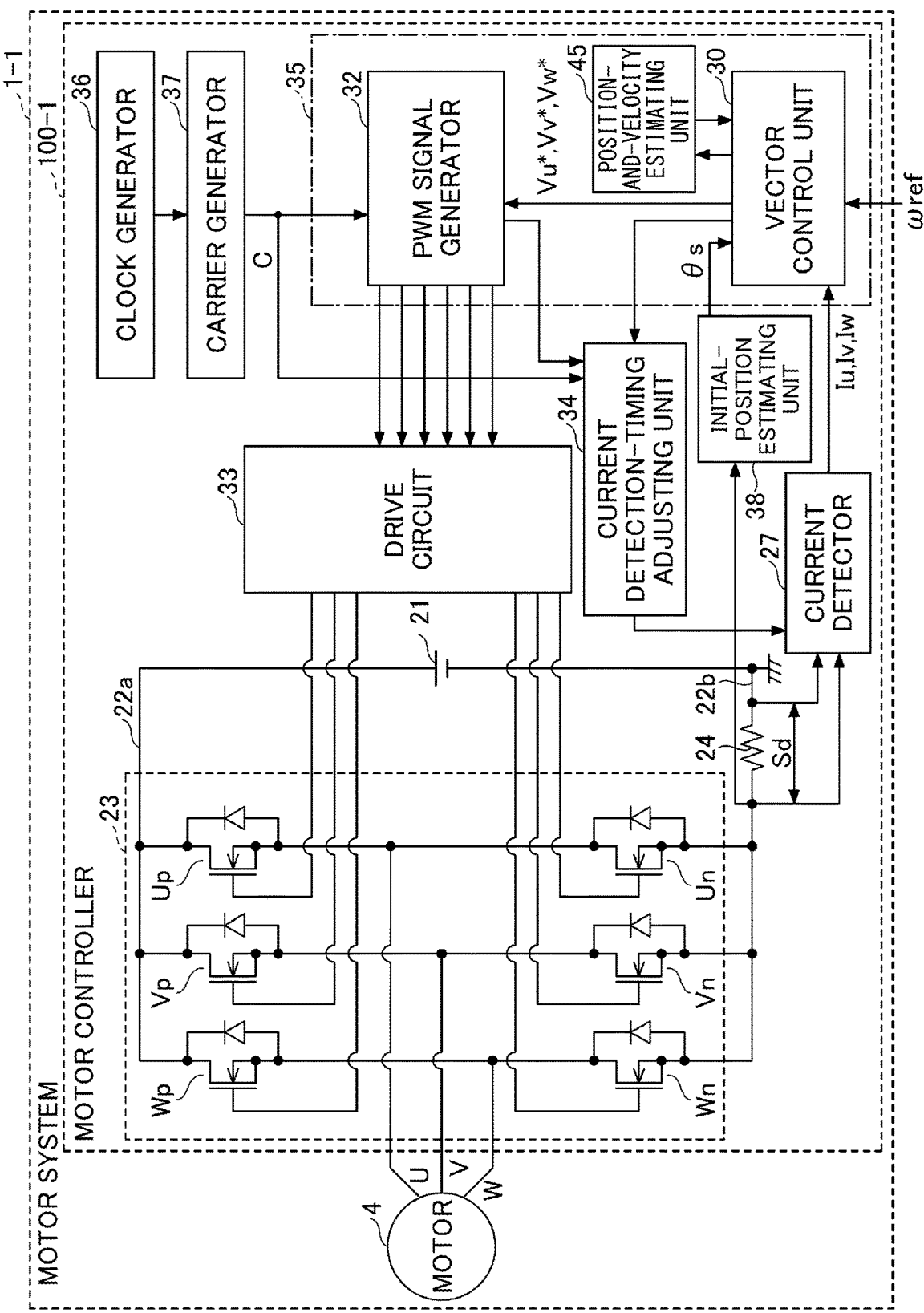
FIG. 1 is a diagram illustrating an example of the configuration of a motor system according to a first embodiment of the present invention.

FIG. 1 is a diagram illustrating an example of the configuration of a motor system 1-1 according to a first embodiment of the present invention. The motor system 1-1 illustrated in FIG. 1 controls a rotary motion of a motor 4. A device in which the motor system 1-1 is provided includes, for example, a copier, a personal computer, a refrigerator, or the like, but is not limited thereto. The motor system 1-1 includes at least the motor 4 and a motor controller 100-1.

The motor 4 is a permanent-magnet synchronous motor including multiple coils. For example, the motor 4 includes three-phase coils having a U-phase coil, a V-phase coil, and a W-phase coil. A specific example of the motor 4 includes a three-phase brushless DC motor or the like. The motor 4 includes a rotor at which at least one permanent magnet is arranged, and includes a stator disposed around an axis of the rotor. The motor 4 is a sensorless motor that does not use any position sensor to detect an angular position (pole position) of a magnet of a rotor. The motor 4 is, for example, a fan motor that rotates a fan for blowing air.

Based on an energization pattern that includes PWM signals for three phases, the motor controller 100-1 performs on-off control for the multiple switching elements, which are coupled to constitute a three-phase bridge, and thus drives the motor through an inverter that converts a direct current into a three-phase alternating current. The motor controller 100-1 includes an inverter 23, a current detector 27, a current detection-timing adjusting unit 34, a drive circuit 33, an energization pattern generator 35, a carrier generator 37, and a clock generator 36.

The inverter 23 is a circuit that converts the direct current delivered from a DC power source 21 into the three-phase alternating current, by switching of the switching elements, and then rotates a rotor of the motor 4 in response to a three-phase drive alternating current flowing into the motor 4. The inverter 23 drives the motor 4 based on multiple energization patterns (more specifically, PWM signals, for three phases, generated by the PWM signal generator 32 in the energization pattern generator 35) that the energization pattern generator 35 generates. PWM means pulse width modulation.

The inverter 23 includes multiple arms Up, Vp, Wp, Un, Vn, and Wn that are coupled to constitute a three-phase bridge. Upper arms Up, Up, and Wp are high-side switching elements that are coupled to a positive electrode of the DC power source 21, via a positive-side bus 22a. Lower arms Un, Vn, and Wn are low-side switching elements that are coupled to a negative electrode (specifically, a ground) of the DC power source 21. The multiple arms Up, Vp, Wp, Un, Vn, and Wn are each turned on or off in accordance with a corresponding drive signal, among multiple drive signals that the drive circuit 33 provides based on respective PWM signals included in the energization pattern. In the following description, the arms Up, Vp, Wp, Un, Vn, and Wn may be also simply referred to as arms, when they are not particularly distinguished from one another.

A connection point of the upper arm Up for the U-phase and the lower arm Un for the U phase is coupled to one end of the U-phase coil of the motor 4. A connection point of the upper arm Vp for the V phase and the lower arm Vn for the V phase is coupled to one end of the V-phase coil of the motor 4. A connection point of the upper arm Wp for the W phase and the lower arm Wn for the W phase is coupled to one end of the W-phase coil of the motor 4. The respective other ends of the U-phase coil, the V-phase coil, and the W-phase coil are coupled to one another.

A specific example of each arm includes an N-channel MOSFET (metal oxide semiconductor field effect transistor), an IGBT (insulated gate bipolar transistor), or the like. However, the arm is not limited to the examples described above.

The current detection unit 24 is coupled at a DC side of the inverter 23 and outputs a detection signal Sd corresponding to the magnitude of the current that flows into the DC side of the inverter 23. The current detection unit 24 illustrated in FIG. 1 generates the detection signal Sd corresponding to the magnitude of the current flowing into a negative-side bus 22b. The current detection unit 24 is, for example, a current detection element disposed in the negative-side bus 22b. More specifically, the current detection unit 24 is a shunt resistor inserted in the negative-side bus 22b. The current detection element such as a shunt resistor generates, as a detection signal Sd, a voltage signal corresponding to the magnitude of the current through the current detection element.

The current detector 27 obtains the detection signal Sd based on the multiple energization patterns (more specifically, PWM signals for three phases) that the energization pattern generator 35 generates, to thereby detect phase currents Iu, Iv, and Iw, for the phases U, V, and W, flowing through the motor 4, respectively. More specifically, by obtaining the detection signal Sd at an acquisition timing that is synchronized with the multiple energization patterns (more specifically, PWM signals for three phases), the current detector 27 detects the phase currents Iu, Iv, and Iw, for the U, V, and W phases, to flow into the motor 4. The acquisition timing of the detection signal Sd is set by the current detection-timing adjusting unit 34.

For example, in the current detector 27, an AD (analog-to-digital) converter receives the detection signal Sd indicating an analog voltage that occurs across the current detection unit 24, at the acquisition timing that is set by the current detection-timing adjusting unit 34. The AD converter is provided in the current detector 27. The current detector 27 performs AD conversion in which the received analog detection signal Sd is converted into a digital detection signal Sd. By digitally processing the digital detection signal Sd after AD conversion, the current detector 27 respectively detects the phase currents for the U, V, and W phases of the motor 4. Detected values indicating the phase currents Iu, Iv, and Iw of the phases, which are detected by the current detector 27, are provided to the energization pattern generator 35.

A clock generator 36 is a circuit that generates a clock at a predetermined frequency, by using a built-in oscillation circuit and that outputs the generated clock to the carrier generator 37. For example, the clock generator 36 operates immediately when the motor controller 100-1 is powered on.

The carrier generator 37 generates a carrier C based on the clock generated by the clock generator 36. The carrier C is a carrier signal of which the level is increased and decreased periodically.

The energization pattern generator 35 generates a pattern (energization pattern of the inverter 23) with which the inverter 23 is to be energized. The energization pattern of the inverter 23 may be used interchangeably with a pattern (energization pattern of the motor 4) with which the motor 4 is to be energized. The energization pattern of the inverter 23 includes PWM signals, for three phases, that enable the inverter 23 to be energized. The energization pattern generator 35 includes a PWM signal generator 32 that generates, based on the detected values indicating the phase currents Iu, Iv, and Iw that flow into the motor 4 and that are detected by the current detector 27, the PWM signals for three phases that enable the inverter 23 to be energized such that the motor 4 rotates.

When the energization pattern generator 35 is to generate the energization pattern of the inverter 23 in vector control, the energization pattern generator 35 further includes a vector control unit 30. In the present embodiment, the energization pattern of the inverter is generated in the vector control.

In response to externally receiving a rotation speed command wref for the motor 4, the vector control unit 30 generates a torque current command Iqref and an exciting current command Idref, based on a difference between either a measured value or estimated value for a rotation speed of the motor 4 and the rotation speed command wref. By vector control calculation using a rotor position θ, the vector control unit 30 calculates a torque current Iq and exciting current Id, based on the phase currents Iu, Iv, and Iw for the phases U, V, and W through the motor 4. For example, the vector control unit 30 performs a calculation in PI control, with respect to a difference between the torque current command Iqref and the torque current Iq, and then generates a voltage command Vq. For example, the vector control unit 30 performs a calculation in PI control, with respect to a difference between the exciting current command Idref and the exciting current Id, and then generates a voltage command Vd. The vector control unit 30 converters the voltage commands Vq and Vd into phase voltage commands Vu*, Vv*, and Vw* for the phases U, V, and W, by using the rotor position θ. The rotor position θ represents the pole position of the rotor in the motor 4.

The PWM signal generator 32 generates the energization pattern that includes the PWM signal for a given phase among three phases, by comparing each of the phase voltage commands Vu*, Vv*, and Vw*, which is generated by the vector control unit 30, against the level of the carrier C generated by the carrier generator 37. The PWM signal generator 32 also generates PWM signals for driving the lower arms, which are respectively obtained by inverting three phase PWM signals for driving the upper arms, adds dead time as necessary, and then outputs energization patterns including the generated PWM signals to the drive circuit 33.

In accordance with the energization patterns including the respective PWM signals, the drive circuit 33 outputs drive signals to switch six arms Up, Vp, Wp, Un, Vn, and Wn that are included in the inverter 23. In such a manner, the three-phase drive alternating current is provided to the motor 4, and thus the motor 4 rotates.

Based on the carrier C, which is delivered from the carrier generator 37, and the energization patterns including the respective PWM signals that are generated by the PWM signal generator 32, the current detection-timing adjusting unit 34 determines an acquirement timing at which, within one period of the carrier C, the current detector 27 detects a phase current for any phase of the three phases.

The current detector 27 detects the phase currents Iu, Iv, and Iw by acquiring the detection signal Sd at acquisition timings that are determined by the current detection-timing adjusting unit 34. The current detector 27 detects the phase currents Iu, Iv, and Iw, in a system (a so-called current detection system that uses one shunt) in which a plurality of phase currents are detected through one current detection unit 24.

As a method of estimating a pole position (initial position) of the rotor when a sensorless-permanent magnet synchronous motor is stopped, an approach called inductive sensing is used. The inductive sensing is the approach to detect the pole position of the rotor magnet of the permanent magnet synchronous motor, by using dependency of inductance on the rotor position. Such an approach to detect the position does not use an electromotive force of the motor, and thus the pole position of the rotor magnet can be detected even when the rotor of the motor is stopped or in a state of being at an extremely low velocity. The state of being at the extremely low velocity of the rotor refers to a state in which the rotor is rotating at a low velocity to the extent that the motor controller cannot detect the electromotive force. In the specification, for convenience of explanation, a "state in which the rotor is stopped or at an extremely low velocity" is simply referred to as a "stopped state of the rotor."

The motor controller 100-1 according to the first embodiment includes an initial-position estimating unit 38 that estimates, by inductive sensing, an initial position θs, which is a pole position in a state in which the rotor of the motor is stopped. By using the initial position θs that is estimated by the initial-position estimating unit 38, the energization pattern generator 35 outputs, to the drive circuit 33, energization patterns including PWM signals that cause the rotor of the motor 4 to rotate. The vector control unit 30 converts voltage commands Vδ and Vγ into phase voltage commands Vu*, Vv*, and Vw*, by using, as an initial value of the rotor position θ, the initial position θs estimated by the initial-position estimating unit 38. In the present disclosure, the initial position θs is a value corresponding to the width of 30 degrees, as an example. In such a case, the motor 4 is controlled by using a predetermined value that is determined based on the initial position θs.

Figure 2:
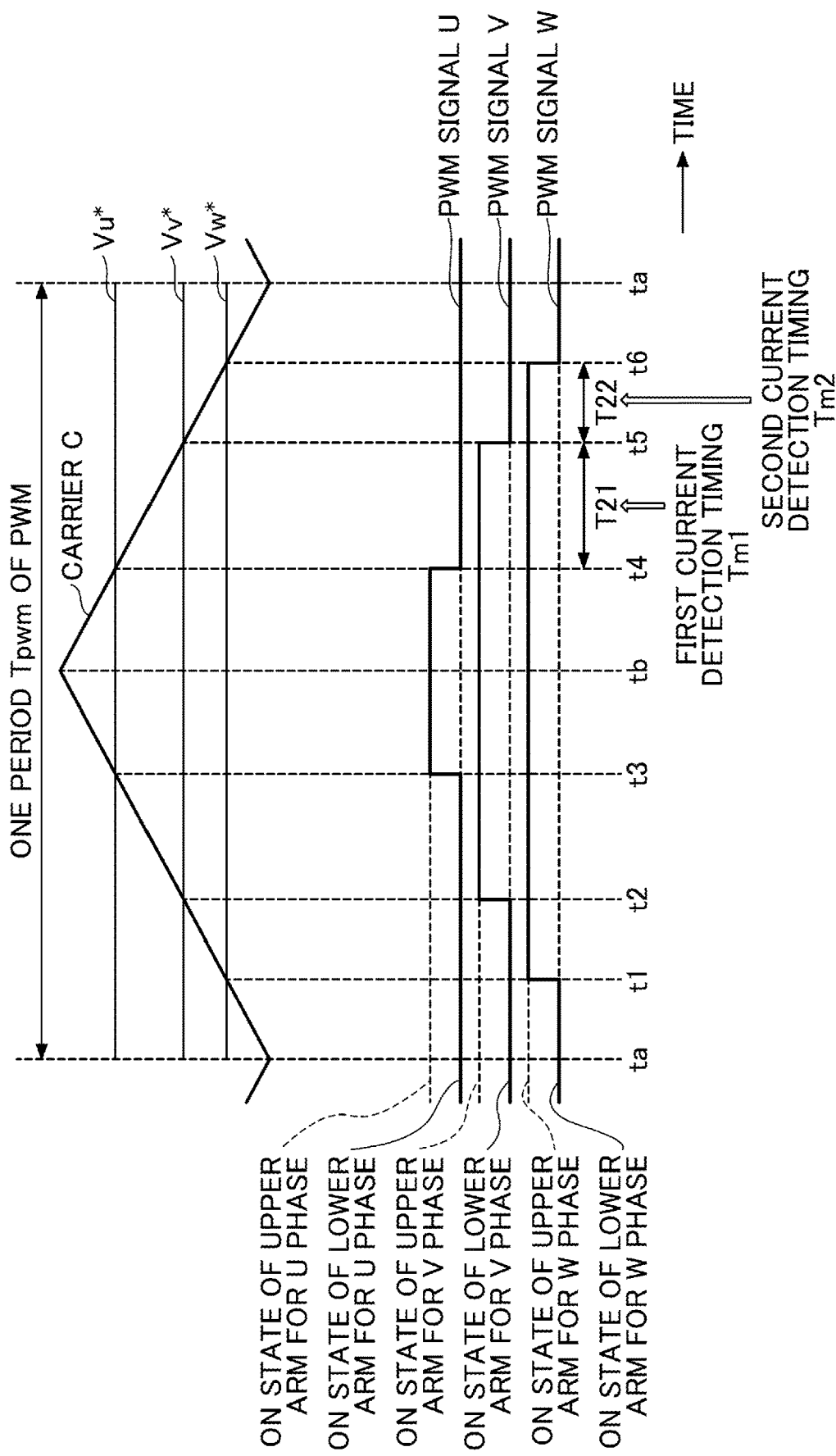
FIG. 2 is a diagram illustrating waveforms of multiple PWM signals, a waveform of a carrier within one period for the PWM signals, and waveforms of phase voltage commands for respective phases.

FIG. 2 is a diagram illustrating waveforms of the PWM signals U, V, and W, the waveform of the carrier C within one period for the PWM signals, and waveforms of phase voltage commands Vu*, Vv*, and Vw* of the respective phases.

The PWM signal generator 32 generates each of the PWM signals U, V, and W, based on the magnitude relationship between a corresponding command, among the phase voltage commands Vu*, Vv*, and Vw* for the respective phases, and the level of the carrier C.

The PWM signal U is a PWM signal for driving two switching elements that constitute the upper and lower arms for the U phase. In this example, when the PWM signal U is at a low level, the switching element of the lower arm for the U phase is on (the switching element of the upper arm for the U phase is off), and when the PWM signal U is at a high level, the switching element of the lower arm for the U phase is off (the switching element of the upper arm for the U phase is on). In response to changes in the level of the PWM signal U, two switching elements constituting the upper and lower arms for the U phase are turned on or off complementarily.

The PWM signal V is a PWM signal for driving two switching elements that constitute the upper and lower arms for the V phase. In this example, when the PWM signal V is at a low level, the switching element of the lower arm for the V phase is on (the switching element of the upper arm for the V phase is off), and when the PWM signal V is at a high level, the switching element of the lower arm for the V phase is off (the switching element of the upper arm for the V phase is on). In response to changes in the level of the PWM signal V, two switching elements constituting the upper and lower arms for the V phase are turned on or off complementarily.

The PWM signal W is a PWM signal for driving two switching elements that constitute the upper and lower arms for the W phase. In this example, when the PWM signal W is at a low level, the switching element of the lower arm for the W phase is on (the switching element of the upper arm for the W phase is off), and when the PWM signal W is at a high level, the switching element of the lower arm for the W phase is off (the switching element of the upper arm for the W phase is on). In response to changes in the level of the PWM signal W, two switching elements constituting the upper and lower arms for the W phase are turned on or off complementarily.

In FIG. 2, illustration of the dead time used to prevent short-circuit of given upper and lower arms is omitted. In FIG. 2, it is defined that, when a given PWM signal is at the high level, the upper arm for a corresponding phase, corresponding to the given PWM signal, is on, and when a given PWM signal is at the low level, the lower arm for a corresponding phase, corresponding to the given PWM signal, is on. However, the relation between a logical level of the PWM signal and each arm to be on or off may be inversely defined in consideration of a circuit configuration or the like.

One period Tpwm of each of the PWM signals U, V, and W corresponds to a period (reciprocal of a frequency of the carrier C) of the carrier C. Change points (t1 to t6) represent timings at which the logic level of the PWM signal transitions.

As illustrated in FIG. 2, the PWM signal generator 32 may generate the PWM signal of each phase by using one carrier C that is shared for the phases. A triangle waveform that is bilaterally symmetrical with respect to a phase tb is used as the carrier C. With this arrangement, a circuit configuration that generates the waveform of a given PWM signal for each phase can be simplified. A counter for the carrier C decrements a count up to a phase ta, increments a count from the phase ta to the phase tb, and decrements a count after the phase tb. With this arrangement, an increment period and a decrement period are repeated. The PWM signal generator 32 may respectively generate PWM signals for phases, by using a plurality of carriers C corresponding to the respective phases, or may generate the PWM signal of each phase by any other known method.

FIG. 2 illustrates a case where a first current detection timing Tm1 is set within an energization period T21 and a second current detection timing Tm2 is set within an energization period T22. The energization periods within which the first current detection timing Tm1 and the second current detection timing Tm2 are set are not limited to the periods described above.

In a state where the inverter 23 outputs a three-phase alternating current modulated in PWM, the current detector 27 can detect the current for a particular phase, based on a corresponding pattern among the energization patterns for the upper arms Up, Vp, and Wp. Alternatively, in the state where the inverter 23 outputs a three-phase alternating current modulated in PWM, the current detector 27 may detect the current for a particular phase, based on a corresponding pattern among the energization patterns for the lower arms Un, Vn, and Wn.

For example, as illustrated in FIG. 2, within an energizing time period T21, the magnitude of the voltage occurring across both ends of the current detection unit 24 corresponds to the magnitude of the current that is a positive U-phase current "+Iu" flowing via the U-phase terminal of the motor 4. The energizing time period T21 is a period from t4 to t5. The energizing time period T21 corresponds to a period during which the lower arm Un and the upper arms Vp and Wp are in an on state and the remaining three arms are in an off state. Thus, by acquiring the detection signal Sd at the first current detection timing Tm1 set within the energizing time period T21, the current detector 27 can detect the magnitude of the current that is a positive U-phase current "+Iu" flowing via the U-phase terminal of the motor 4.

After a predetermined delay time td elapses from the time when the level of a given PWM signal for one phase, among the PWM signals, shifts to a different logic level from PWM signals for remaining two phases (for example, t4: a timing at which the level of a given PWM signal for the U phase changes from the same high level as levels of PWM signals for the V phase and W phase, to a different low level from levels of the PWM signals for the V phase and W phase), the current detection-timing adjusting unit 34 sets the first current detection timing Tm1. At this time, the current detection-timing adjusting unit 34 sets the first current detection timing Tm1 within the energizing time period T21.

Also, for example, as illustrated in FIG. 2, in an energizing time period T22, the magnitude of the voltage occurring across the both ends of the current detection unit 24 corresponds to the magnitude of the current that is a negative W-phase current "−Iw" flowing via the W-phase terminal of the motor 4. The energizing time period T22 is a period from t5 to t6. The energizing time period T22 corresponds to a period in which the lower arms Un and Vn and the upper arm Wp are in an on state and the remaining three arms are in an off state. Thus, by acquiring the detection signal Sd at the second current detection timing Tm2 set within the energizing time period T22, the current detector 27 can detect a negative W-1 phase current "−Iw" that flows via the W-phase terminal of the motor 4.

After a predetermined delay time td elapses from the time when the level of a given PWM signal for one phase, among the PWM signals, shifts to a different logic level from PWM signals for remaining two phases (for example, t5: a timing at which the level of a given PWM signal for the V phase changes from the same high level as a level for the W phase, to the same low level as that for the U phase, so that the level for the W phase becomes a different logical level from levels for the U phase and V phase), the current detection-timing adjusting unit 34 sets the second current detection timing Tm2. At this time, the current detection-timing adjusting unit 34 sets the second current detection timing Tm2 within the energizing time period T22.

Likewise, the current detector 27 can also detect the magnitude of a given current for another phase.

As described above, when currents for two phases, among the phase currents Iu, Iv, and Iw, are sequentially detected based on energization patterns that include PWM signals for three phase, and then the detected currents are stored, three-phase currents can be detected by time division. In view of a total sum of the three-phase currents being zero (iu+iv+iw=0), if the current detector 27 can detect phase currents for two phases of three phases, the current detector 27 can also detect a phase current for the remaining one phase.

Figure 3:
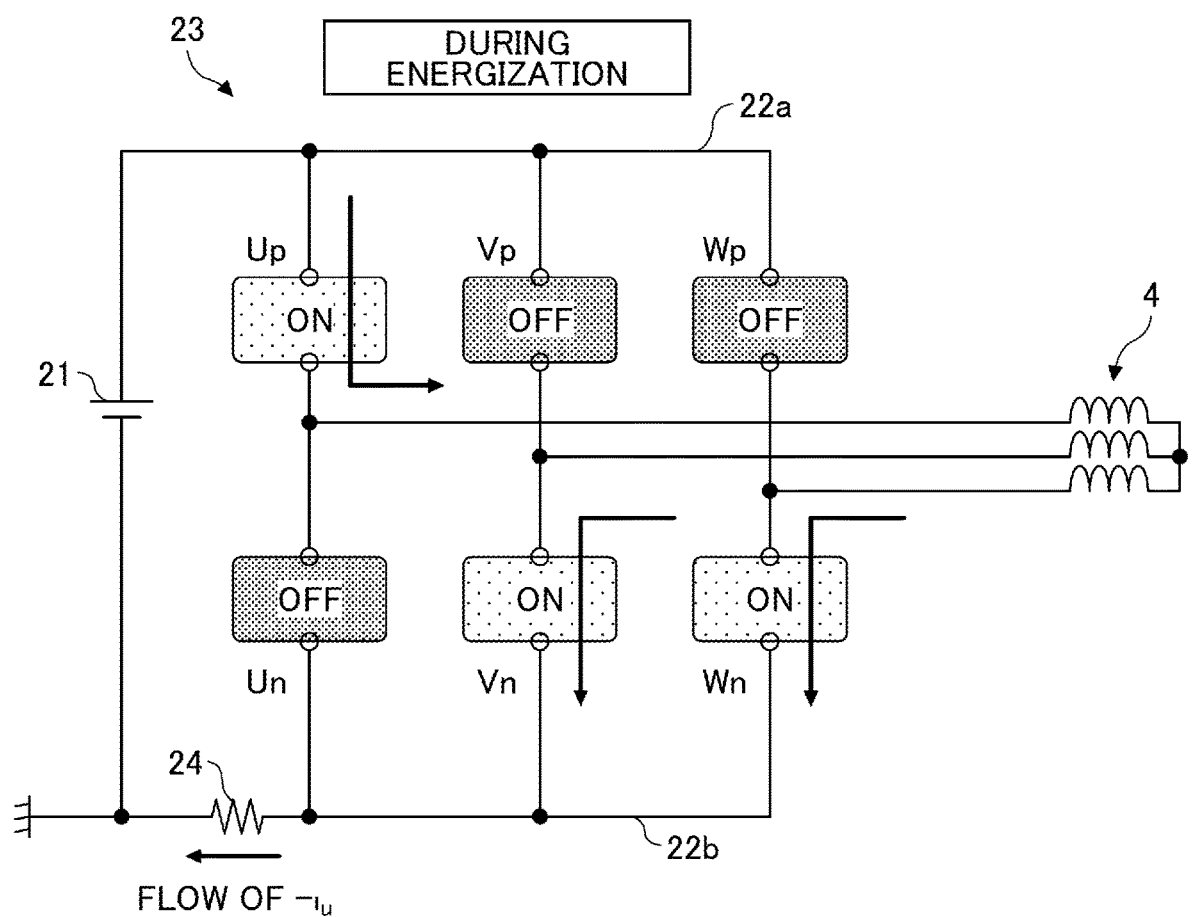
FIG. 3 is a diagram illustrating an example of a switching state for each arm that is energized.
Figure 4:
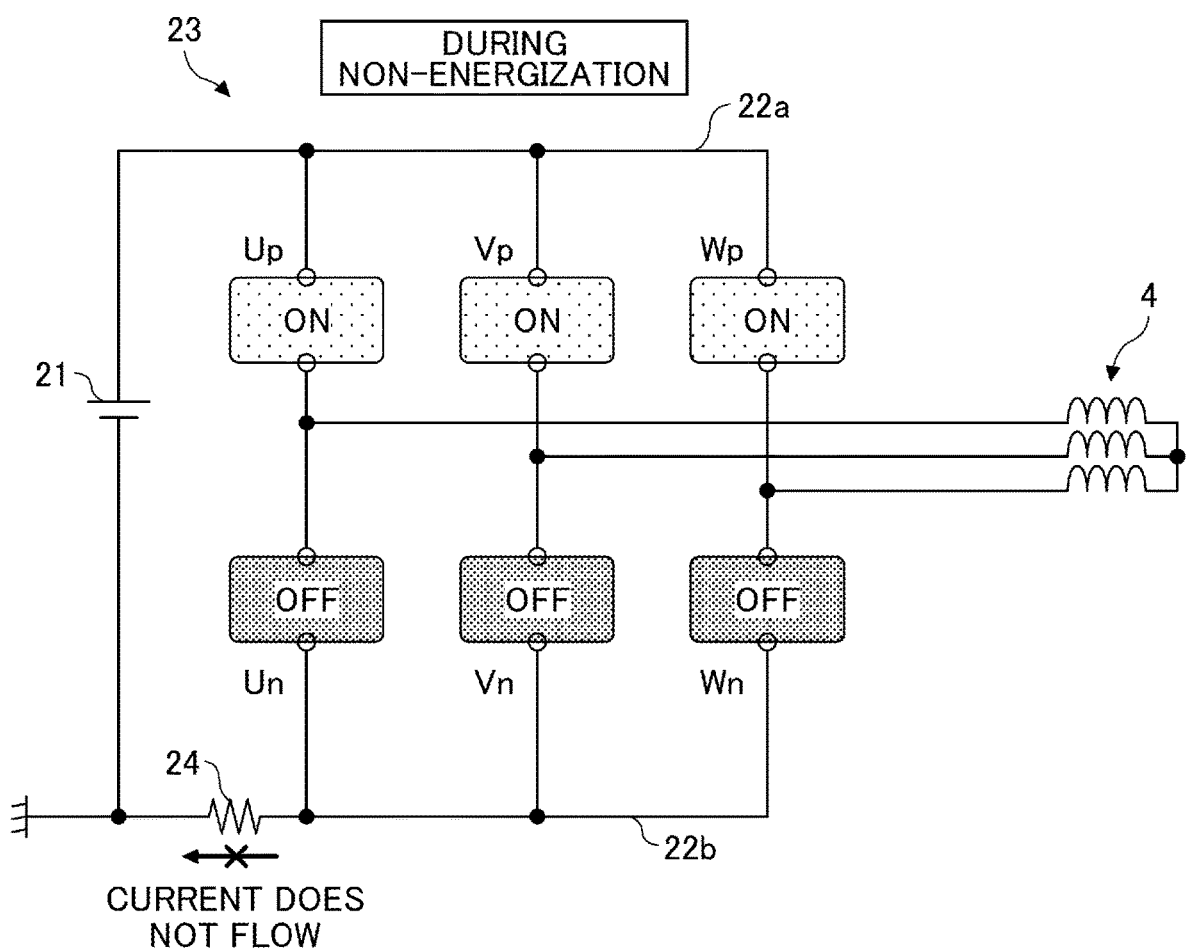
FIG. 4 is a diagram illustrating an example of the switching state for each arm that is not energized.

FIG. 3 is a diagram illustrating an example of a switching state for each arm that is energized. FIG. 4 is a diagram illustrating an example of a switching state for each arm that is not energized. As illustrated in FIG. 3, in a given energization period in which the upper arm Up and the lower arms Vn and Wn are in an on state and the remaining three arms are in an off state, the current detector 27 can detect the magnitude of the current that is the negative U-phase current "−Iu" flowing via the U-phase terminal of the motor 4. In contrast, as illustrated in FIG. 4, in a state in which all the upper arms Up, Vp, and Wp are in an on state and all the lower arms Un, Vn, and Wn are in an off state, the current does not flow through the current detection unit 24, and thus the current detector 27 cannot detect the phase current for each phase. Even in a state in which all the upper arms Up, Vp, and Wp are in an off state and all the lower arms Un, Vn, and Wn are in an on state, the current does not flow into the current detection unit 24, and thus the current detector 27 cannot detect the phase current for each phase.

As described above, in the current detection system that uses one shunt, the phase current for each phase cannot be detected unless any energization section (energizing time) is provided. In the current detection system that uses one shunt, since the phase current that can be detected using one energization time corresponds to only one phase, at least two energization times are provided during one period of the PWM signal (see FIG. 2), and then phase currents for three phases are separately detected based on an equation of (iu+iv+iw=0). However, when the energizing times are provided in order to separately detect the phase currents for the phases, the current flowing into the current detection unit 24 is amplified. With this arrangement, when the current flowing into the current detection unit 24 is zero, the current detector 27 cannot measure a detection error that is included in a detected value of the phase current for each phase.

Therefore, when the motor is stopped, in a case where a portion of all arms of the inverter 23 is turned on in accordance with the PWM signal, for each phase, having the same duty ratio, the current of each phase flowing into the current detection unit 24 may be defined as an offset current. In this case, the current detector 27 detects, as a current magnitude (detection error) of the offset current, a current magnitude for the offset current of each phase flowing into the current detection unit 24, by turning on a portion of all arms of the inverter 23 in accordance with the PWM signal, for each phase, having the same duty cycle.

Figure 5:
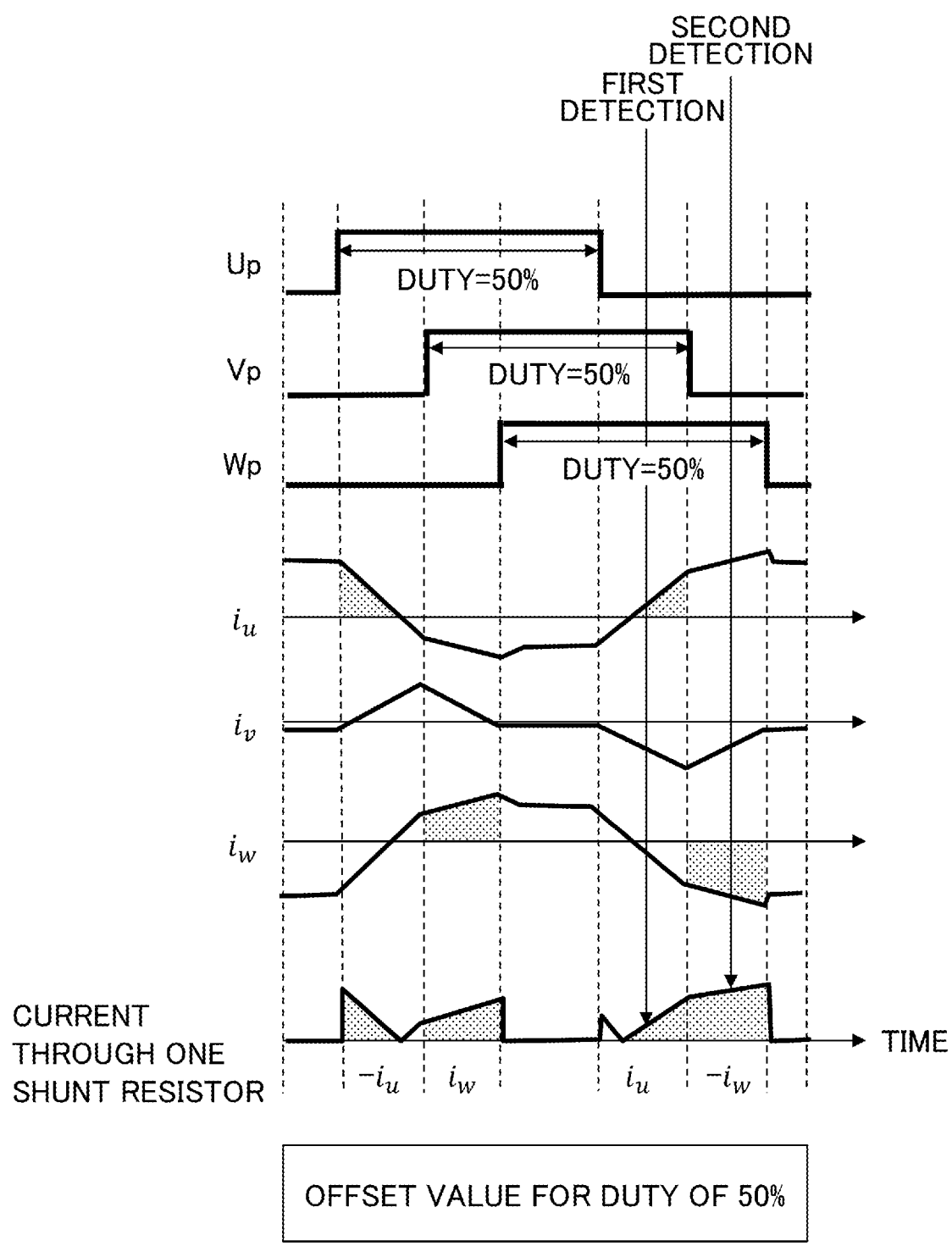
FIG. 5 is a timing chart illustrating an offset current for each phase flowing through a current detection unit, by turning on a portion of all arms of an inverter in accordance with the PWM signal for a corresponding phase, with a duty cycle of 50%.
Figure 6:
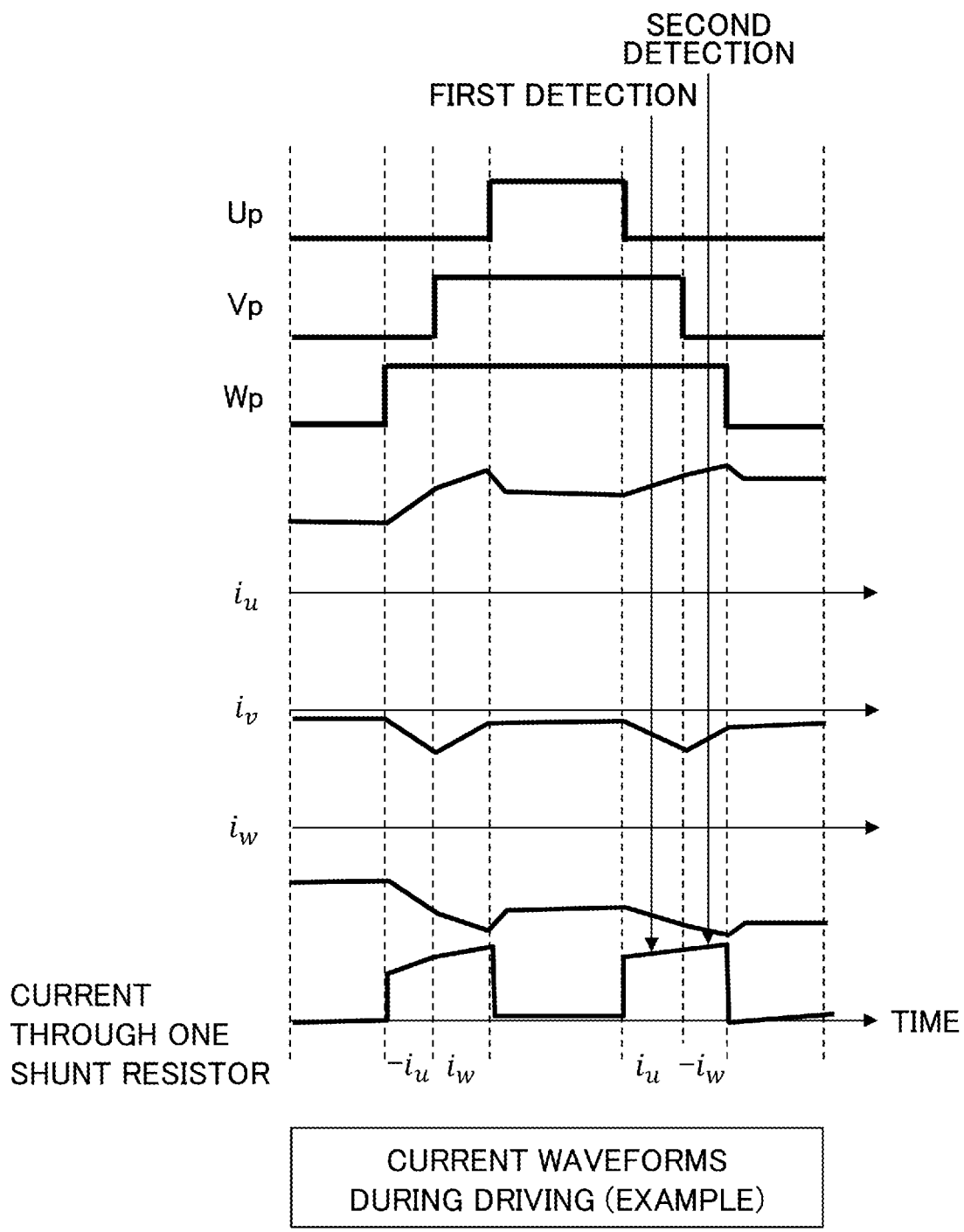
FIG. 6 is a timing chart illustrating a phase current for each phase flowing through the current detection unit, by turning on the same portion of all arms as illustrated in FIG. 5, while the inverter rotates the rotor in accordance with the PWM signal for a corresponding phase, with a duty cycle different from the duty cycle of 50%.

FIG. 5 is a timing chart illustrating the offset current for each phase flowing through the current detection unit 24, by turning on a portion of all arms of the inverter 23 in accordance with the PWM signal for a corresponding phase, with a duty cycle of 50%, as an example. FIG. 6 is a timing chart illustrating the phase current for each phase flowing through the current detection unit 24, by turning on the same portion of all arms as illustrated in FIG. 5, while the inverter 23 rotates the rotor in accordance with the PWM signal for a corresponding phase, with a duty cycle different from the duty cycle of 50%.

In FIG. 5, the current detector 27 detects the current magnitude of each of offset currents for the three phases, by performing current detection at least two times for each period of the PWM signal, before the inverter 23 rotates the rotor (before the motor 4 starts up). The current detector 27 stores detected current magnitudes in the memory, as offset current magnitudes for the three phases. FIG. 5 illustrates a case in which the current detector 27 detects offset current magnitudes for the positive U-phase current "Iu" and the negative W-phase current "−Iw", detects (calculates) an offset current magnitude for the remaining V-phase current, based on detected results for the positive U-phase current and the negative W-phase current, and then stores the detected offset current magnitudes for the three phases. After the offset current magnitudes for the three phases are stored in the memory, the motor 4 starts with the inverter 23, and thus the inverter 23 rotates the rotor.

In FIG. 6, while the inverter 23 rotates the rotor in accordance with the PWM signal for each phase with any duty cycle that is different from the duty cycle of 50%, the current detector 27 detects the current magnitude for each of the three phases, by performing, for each one period of the PWM signal, current detection at least two times, with the same energization pattern as the energization pattern described in FIG. 5. The current detector 27 calculates the detected current magnitude for each of the phase currents Iu, Iv, and Iw of the three phases, by subtracting, for each period of the PWM signal, the offset current magnitude for a corresponding phase among the three phases, which is stored in advance in the memory, from the current magnitude of the phase current, for the corresponding phase among the three phases, that is detected for a corresponding period of the PWM signal. With this arrangement, detection error is removed from the detected current magnitude for each of the phase currents Iu, Iv, and Iw of the three phases. While the inverter 23 rotates the rotor, the PWM signal generator 32 generates the three phase PWM signal, based on the detected current magnitude, from which detection error is removed, for each of the phase currents Iu, Iv, and Iw of the three phases. Thus, rotation of the motor 4 can be controlled by the inverter 23, with high accuracy.

Even in a state in which the inverter 23 does not rotate the rotor in accordance with the three phase alternating current, there are cases where the rotor is idling due to disturbance such as wind. In particular, the rotor that rotates a rotating body, such as a fan having a relatively low frictional resistance, is likely to be idling.

In order to start permanent magnet synchronous motors, there are many cases where pole positions of rotor magnets are detected by inductive sensing to thereby start motors, or by open loop control concerning velocity to thereby rotate the motors in any direction without detecting any pole positions. However, in a state in which the rotor is idling, it is difficult to estimate the pole position by the inductive sensing. Thus, if the motor starts up without detecting any pole positions during idling, or any idle velocity, abnormality such as abnormal noise may occur in the motor. In order to perform smooth start-up during an idle time of a given rotor, it is required to detect the pole position during the idle time, with an approach other than the inductive sensing, as well as detecting the idle velocity for the motor.

The energization pattern generator 35 of the motor controller 100-1 according to the first embodiment of the present disclosure, as illustrated in FIG. 1, includes a position-and-velocity estimating unit 45 that estimates the pole position and the rotation speed of the rotor during the idle time. The pole position obtained during the idle time may be referred to as an "idling position," and the rotation speed obtained during the idle time may be referred to as an "idle velocity." Each of the idling position and the idle velocity is one of indications for the idling state of the rotor. The idling position and idle velocity of the rotor that are estimated by the position-and-velocity estimating unit 45 are each used by the vector control unit 30, as an initial value that is obtained at start-up of the motor 4, for example.

Figure 7:
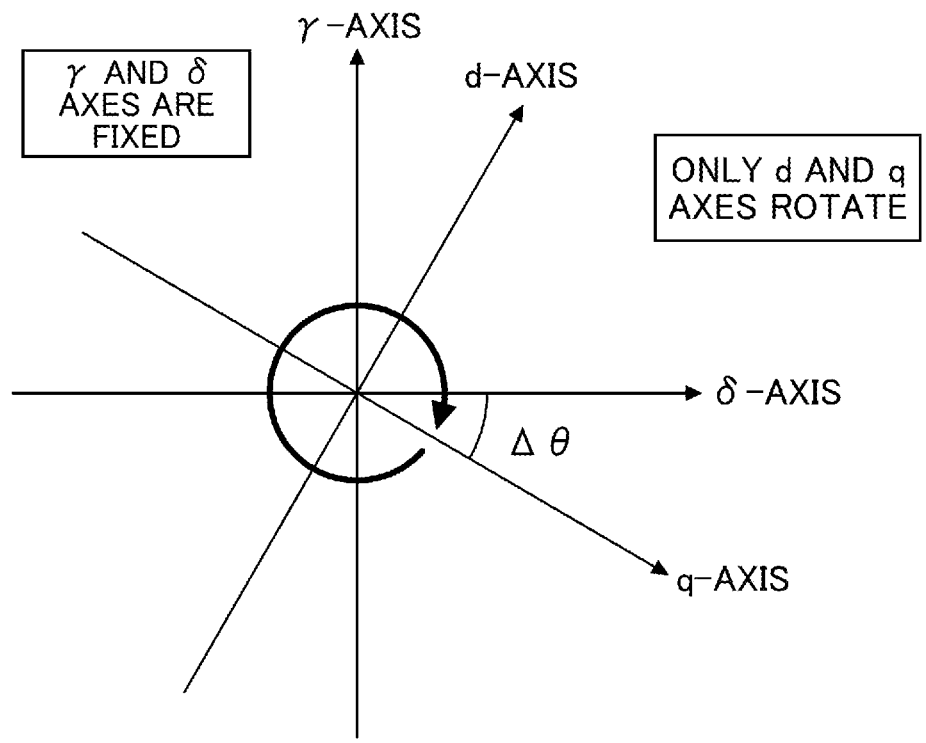
FIG. 7 is a diagram illustrating a coordinate system used in sensorless vector control that is performed by a vector control unit.

FIG. 7 is a diagram illustrating a coordinate system used in the sensorless vector control that is performed by the vector control unit.

A d-axis is an real axis that extends in a real angular direction (direction of the magnetic flux generated through the magnet of the rotor) corresponding to an actual pole position of the rotor. A q-axis is a real axis that extends in a direction advanced (increased) by an electrical angle of 90° relative to the d-axis. The d-axis and the q-axis may be collectively referred to as dq axes. The dq axes are axes in a model used in the sensorless vector control. A pole position θ of the rotor is represented using an angle at which the d-axis is advanced with reference to the position of a reference coil (for example, a U-phase coil) of the motor. A d-q coordinate system is advanced by θ relative to the reference coil.

A γ-axis is a control axis that extends in an estimated angular direction corresponding to an estimated pole position of the rotor. A δ-axis is a control axis that extends in a direction advanced (increased) by an electrical angle of 90° relative to the γ-axis. The γ-axis and the δ-axis may be collectively referred to as γδ axes. The γδ axes are axes in a model used in the sensorless vector control. An estimated pole position $θ_m$, of the rotor is represented by an angle at which the γ-axis is advanced with reference to the position of a reference coil (for example, the U-phase coil) of the motor. A γ-δ coordinate system is advanced by $θ_m$ relative to the reference coil.

A phase difference Δθ is a phase difference between a given real axis (dq axes) and a given control axis (γδ axes). The phase difference Δθ is represented by a phase difference between the q-axis and the δ-axis or a phase difference between the d-axis and the γ-axis. When the phase difference Δθ is 0, the γ-δ coordinate system coincides with the d-q coordinate system.

The vector control unit 30 has any known configurations such as a velocity controller, a current controller, an output converter, and an input converter. Briefly described, the velocity controller is a velocity control system that generates a γ-axis current command value $I_\gamma^*$ and a δ-axis current command value $I_\delta^*$ in the γ-δ coordinate system, such that the difference between the rotation speed command ωref, which is obtained from the outside, and a velocity estimate $\omega_m$, which is derived by the position-and-velocity estimating unit 45, converges to 0. The current controller generates a γ-axis voltage command value $V_\gamma$ such that the difference between the γ-axis current command value $I_\gamma^*$, which is generated by the velocity controller, and a detected γ-axis current magnitude $I_\gamma$, which is generated by the input converter, converges to 0. The current controller generates a δ-axis voltage command value $V_\delta$ such that the difference between the δ-axis current command value $I_\delta^*$, which is generated by the velocity controller, and a detected δ-axis current magnitude $I_\delta$, which is generated by the input converter, converges to 0. The output converter converts a γ-axis voltage command value $V_\gamma^*$ and a δ-axis voltage command value $V_\delta^*$ into phase voltage commands Vu*, Vv*, and Vw* for the U, V, and W phases, by using the estimated pole position $\theta_m$ that is derived by the position-and-velocity estimating unit 45. The input converter converts the three phase currents $^T$u, Iv, and Iw detected by the current detector 27, into the detected γ-axis current magnitude $I_\gamma$ and the detected δ-axis current magnitude $I_\delta$ for two phases, by using the estimated pole position $\theta_m$ that is derived by the position-and-velocity estimating unit 45.

The position-and-velocity estimating unit 45 derives the estimated pole position $\theta_m$ and the velocity estimate $\omega_m$, from the detected γ-axis current magnitude $I_\gamma$ and the detected δ-axis current magnitude $I_\delta$ that are generated by the input converter, and from the γ-axis voltage command value $V_\gamma$ and the δ-axis voltage command value $V_\delta$ that are generated by the current controller. The position-and-velocity estimating unit 45 includes a position estimating unit that derives the estimated pole position $\theta_m$, and includes a velocity estimating unit that derives the velocity estimate $\omega_m$. The position-and-velocity estimating unit 45 derives the estimated pole position $\theta_m$ and the velocity estimate $\omega_m$, by any known estimation method, in a state where the motor 4 starts with the inverter 23 and thus the inverter 23 rotates the rotor.

The position-and-velocity estimating unit 45 according to the first embodiment of the present disclosure further has a so-called windmill start function of estimating the idling position and the idle velocity of the rotor. The windmill start function estimates the idling state (for example, a phase (idling position) during an idle time, an idle velocity, a rotation direction (idling direction) during the idle time, and the like) of the rotor based on the phase difference Δθ, and implements a smooth rotation control during the idle time of the rotor. For example, the position-and-velocity estimating unit 45 estimates the idling state of the rotor before performing inductive sensing, and determines whether the rotor is stopped or idling. If it is determined that the rotor is stopped, the initial-position estimating unit 38 estimates the pole position and the like of the stopped rotor, by using the inductive sensing, and if it is determined that the rotor is idling, the position-and-velocity estimating unit 45 estimates the idling position and the idle velocity, and the like of the rotor, by using the windmill start function.

The windmill start function according to the present disclosure has a plurality of systems. A first system is a system in which the estimated pole position $\theta_m$ and the velocity estimate $\omega_m$, which are derived using periodicity of the phase difference Δθ, are input to the vector control unit 30 as initial values obtained during start-up to thereby shift to the sensorless vector control (hereinafter referred to as a first windmill start function). A second system is a system in which the estimated pole position $\theta_m$ and the velocity estimate $\omega_m$, which are derived by inputting the phase difference Δθ to a pole position estimation system of the position-and-velocity estimating unit 45, are input to the vector control unit 30 after the derived pole position and velocity estimate become stable, to thereby shift to the sensorless vector control (hereinafter referred to as a second windmill start function). Although both functions are the same in terms of the fact that the phase difference Δθ is detected (estimated) by the observer, they differ from each other in an approach to shift to the sensorless vector control.

<First Windmill Start Function>

The process implemented by the first windmill start function will be described with reference to FIGS. 8 to 13.

In the first windmill start function, the vector control unit 30 fixes the γ-axis and the δ-axis at a position where the estimated pole position $\theta_m$ is 0, and fixes, to 0, each of the γ-axis current command value $I_\gamma^*$ and the δ-axis current command value Iδ*, and then causes the current controller to perform the current control. After performing the current control as described above, the vector control unit 30 inputs, to the observer in the position-and-velocity estimating unit 45, voltage command values (the y-axis voltage command value Vγ and δ-axis voltage command value Vδ), which are output from the current controller, and detected current magnitudes (the detected γ-axis current magnitude $I_\gamma$ and detected δ-axis current magnitude Iδ), which are output from the input converter.

Figure 8:
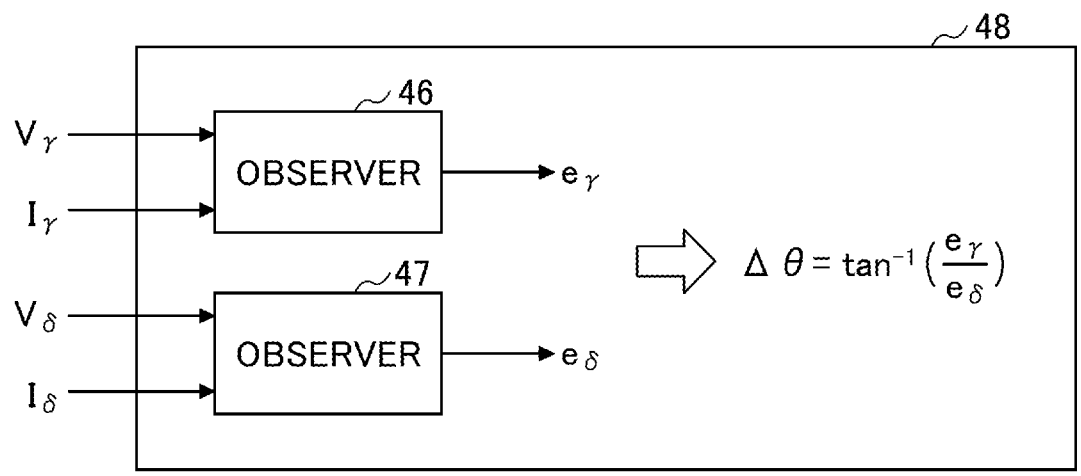
FIG. 8 is a diagram illustrating an example of the configuration of an observer in a position-and-velocity estimating unit.

FIG. 8 is a diagram illustrating an example of the configuration of the observer in the position-and-velocity estimating unit. An observer 48 illustrated in FIG. 8 is provided in the position-and-velocity estimating unit 45. The observer 48 estimates electromotive forces e (γ-axis electromotive force $e_\gamma$, δ-axis electromotive force $e_\delta$) that are generated through the coil of the motor 4 due to idling of the rotor. The γ-axis electromotive force eγ is an electromotive force component expressed by the γ-axis that is associated with the electromotive force e, and the δ-axis electromotive force $e_\delta$ is an electromotive force component expressed by the δ-axis that is associated with the electromotive force e. The observer 48 includes a first observer 46 and a second observer 47. The first observer 46 estimates the γ-axis electromotive force eγ during the idle time of the rotor, from the γ-axis voltage command value $V_\gamma$ and the detected γ-axis current magnitude $I_\gamma$ that are input by the first windmill start function. The second observer 47 estimates the δ-axis electromotive force $e_\delta$ during the idle time of the rotor, from the δ-axis voltage command value $V_\delta$ and the detected δ-axis current magnitude $I_\delta$ that are input by the first windmill start function. As a specific example of each of the first observer 46 and the second observer 47 includes a known extended electromotive voltage observer. However, the observer 48 may estimate the γ-axis electromotive force $e_\gamma$ and the δ-axis electromotive force $e_\delta$ during the idle time of the rotor of the motor, by using a system different from the extended electromotive force observer.

Without using any observers, the position-and-velocity estimating unit 45 may determine a given electromotive force by performing a calculation using a general voltage equation.

The observer 48 includes a derivation unit that derives the phase difference Δθ between the dq-axes and the γδ-axes, from the γ-axis electromotive force $e_\gamma$ and the δ-axis electromotive force $e_\delta$. For example, the observer 48 calculates the phase difference Δθ by substituting, into an arctangent function illustrated in FIG. 8, estimated values of the γ-axis electromotive force $e_γ$ and the δ-axis electromotive force $e_δ$.

Figure 9:
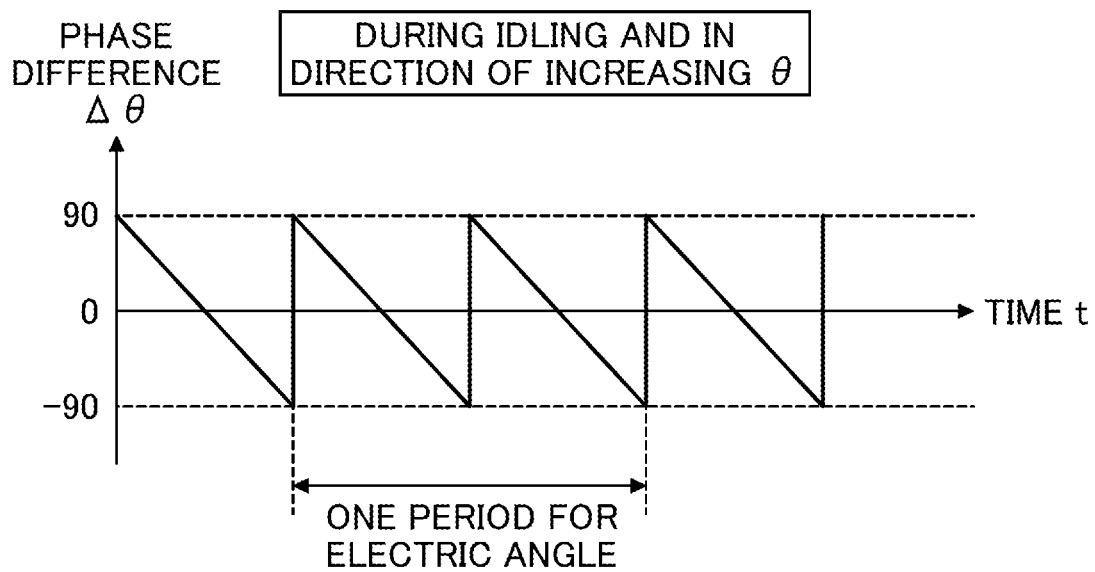
FIG. 9 is a diagram illustrating the behavior of a phase difference, during an idle time, obtained in a direction of increasing a pole position.
Figure 10:
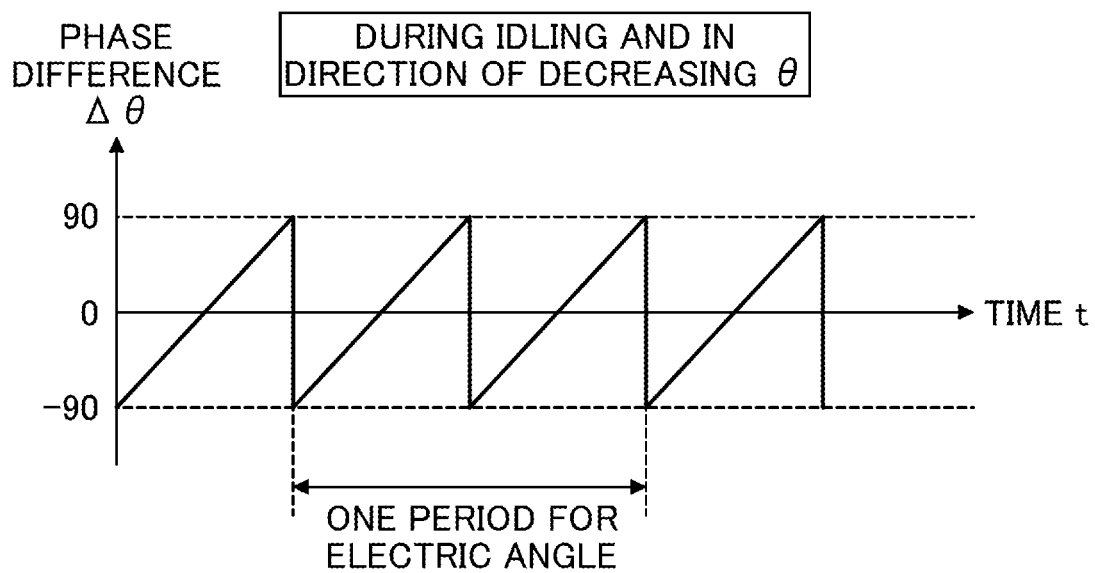
FIG. 10 is a diagram illustrating the behavior of the phase difference, during the idle time, obtained in a direction of decreasing the pole position.

FIG. 9 is a diagram illustrating the behavior of the phase difference Δθ, during the idle time, obtained in the direction of increasing the pole position θ. FIG. 10 is a diagram illustrating the behavior of the phase difference Δθ, during the idle time, obtained in the direction of decreasing the pole position θ. The phase difference Δθ indicates the phase difference of an actual pole position (d-axis) from the γ-axis that is fixed at the position where the estimated pole position $θ_m$ is 0, and is detected to show a periodical sawtooth waveform ranging from −90° to 90°. Two periods of the sawtooth waveform correspond to one rotation of the rotor. The position-and-velocity estimating unit 45 estimates the idle velocity from the time (time length corresponding to two periods of the sawtooth waveform) required for one rotation of the rotor, by using the periodicity of the phase difference Δθ described above, and inputs an estimated value of the idle velocity to the velocity controller of the vector control unit 30, as an initial value obtained when the phase difference Δθ is 0. With this arrangement, the vector control unit 30 can perform sensorless vector control while smoothly moving the idling rotor. The description will be provided below in more detail with reference to FIGS. 11 and 12.

Figure 11:
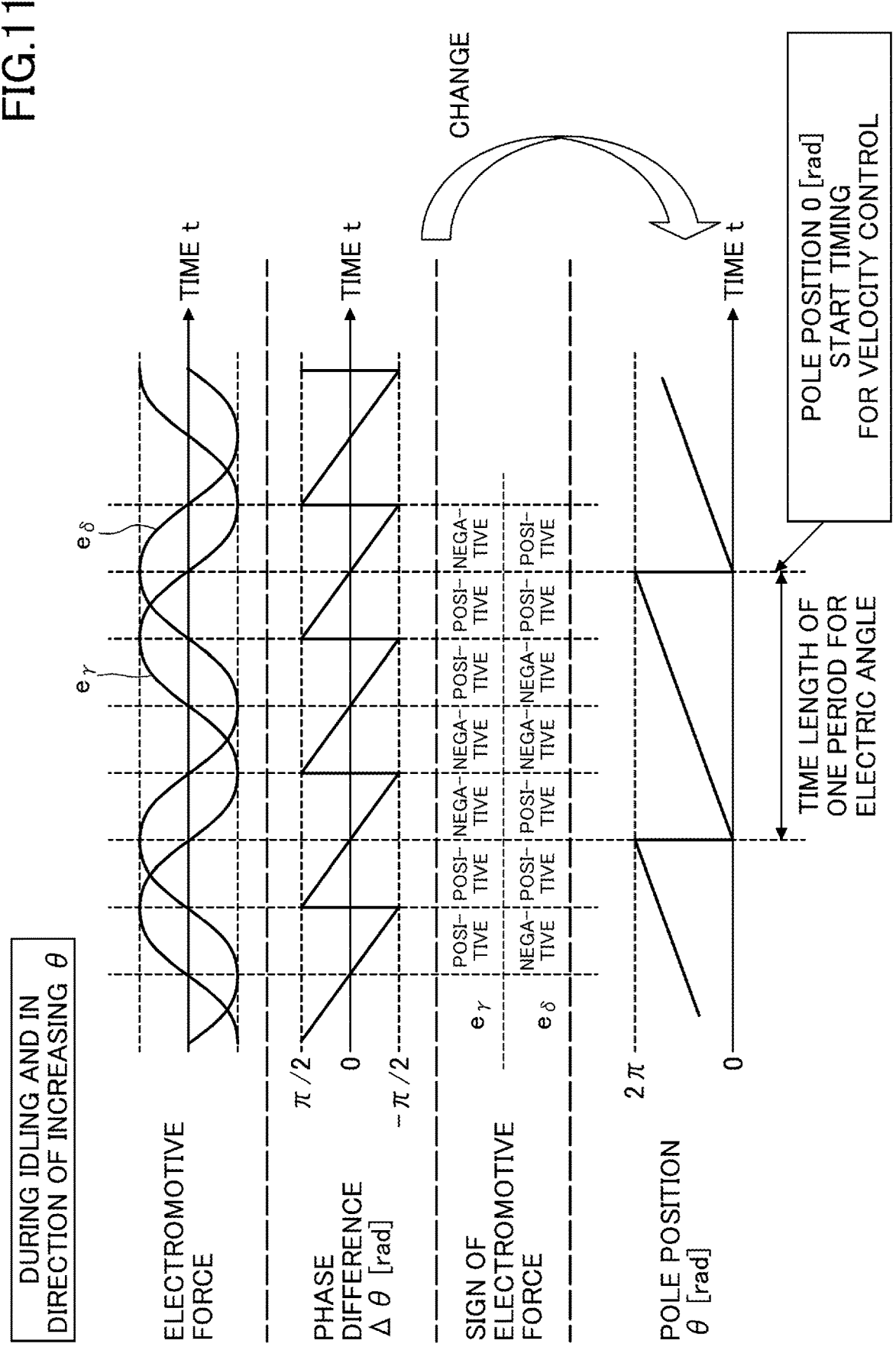
FIG. 11 is a timing chart illustrating the relationship among electromotive forces, the phase difference, and the pole position, during the idle time, that are obtained in the direction of increasing the pole position.
Figure 12:
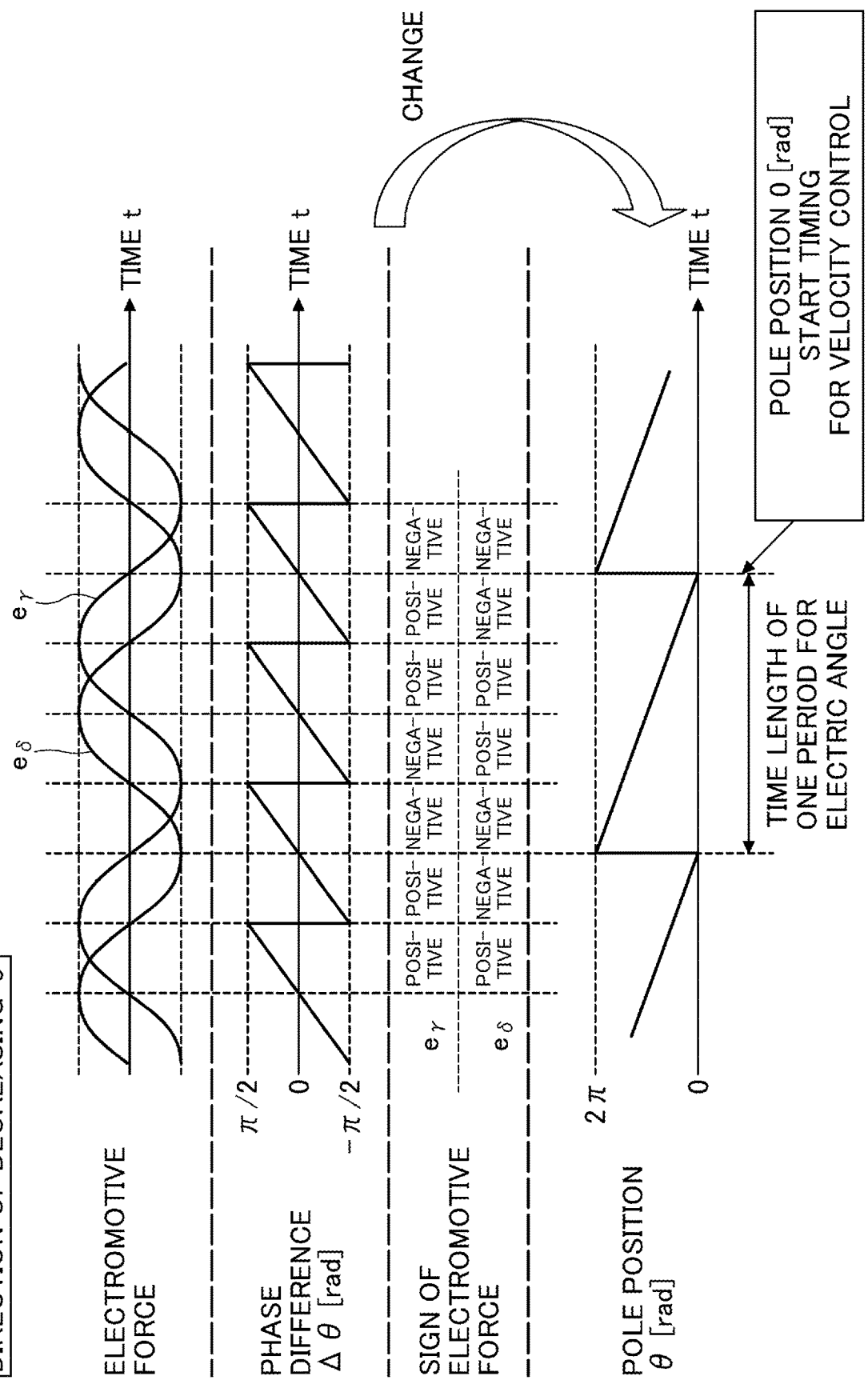
FIG. 12 is a timing chart illustrating the relationship among electromotive forces, the phase difference, and the pole position, during the idle time, that are obtained in the direction of decreasing the pole position.

FIG. 11 is a timing chart illustrating the relationship among the electromotive forces e, the phase difference Δθ, and the pole position θ, during the idle time, that are obtained in the direction of increasing the pole position θ. FIG. 12 is a timing chart illustrating the relationship among the electromotive forces e, the phase difference Δθ, and the pole position θ, during the idle time, that are obtained in the direction of decreasing the pole position θ.

The position-and-velocity estimating unit 45 estimates the idle velocity of the rotor from the periodicity of the phase difference Δθ that is derived by the observer 48. Since two periods of the sawtooth waveform defined by the phase difference Δθ correspond to one period defined by an electrical angle, the position-and-velocity estimating unit 45 measures the time length of the two periods of the sawtooth waveform defined by the phase difference Δθ to derive (estimate) a measured value of the time length as the idle velocity.

The position-and-velocity estimating unit 45 estimates orientation of the idling rotor from a gradual increase or gradual decrease in the phase difference Δθ that is derived by the observer 48. For example, if the phase difference Δθ gradually decreases as illustrated in FIG. 11, the position-and-velocity estimating unit 45 determines that the rotor is idling in the direction of increasing the pole position θ, and if the phase difference Δθ gradually increases as illustrated in FIG. 12, the position-and-velocity estimating unit 45 determines that the rotor is idling in the direction of decreasing the pole position θ.

The position-and-velocity estimating unit 45 estimates the pole position (idling position) of the rotor during the idle time, from the relationship among the phase difference Δθ derived by the observer 48, a sign of the γ-axis electromotive force $e_γ$ estimated by the first observer 46, and the δ-axis electromotive force $e_δ$ estimated by the second observer 47.

For example, as illustrated in FIG. 11, when idling is performed in the direction of increasing the pole position θ, the pole position θ is 0 at a timing at which signs for the estimated values of the electromotive forces e change from ($e_γ$ is positive and $e_δ$ is positive) to ($e_γ$ is negative and $e_δ$ is positive). At such a timing, the position-and-velocity estimating unit 45 inputs, to the velocity controller of the vector control unit 30, a given estimated value of the idle velocity as an initial value, thereby causing the velocity controller of the vector control unit 30 to perform the velocity control of the rotor at the timing described above.

In contrast, for example, as illustrated in FIG. 12, when idling is performed in the direction of decreasing the pole position θ, the pole position θ is 0 at a timing at which signs for the estimated values of the electromotive forces e change from ($e_γ$ is positive and $e_δ$ is negative) to ($e_γ$ is negative and $e_δ$ is negative). At such a timing, the position-and-velocity estimating unit 45 inputs, to the velocity controller of the vector control unit 30, a given estimated value of the idle velocity as an initial value, thereby causing the velocity controller of the vector control unit 30 to perform the velocity control of the rotor at the timing described above.

Also, the position-and-velocity estimating unit 45 inputs the estimated value of the idle velocity, as an initial value, of each of the rotation speed command ωref and the velocity estimate $ω_m$, that is used in the velocity controller of the vector control unit 30, in addition to inputting as an initial value used in integral control 52 of a pole position estimation system 50 (see FIG. 14) in the position-and-velocity estimating unit 45. With this arrangement, the vector control unit 30 can perform the sensorless vector control while smoothly moving the idling rotor.

Figure 13:
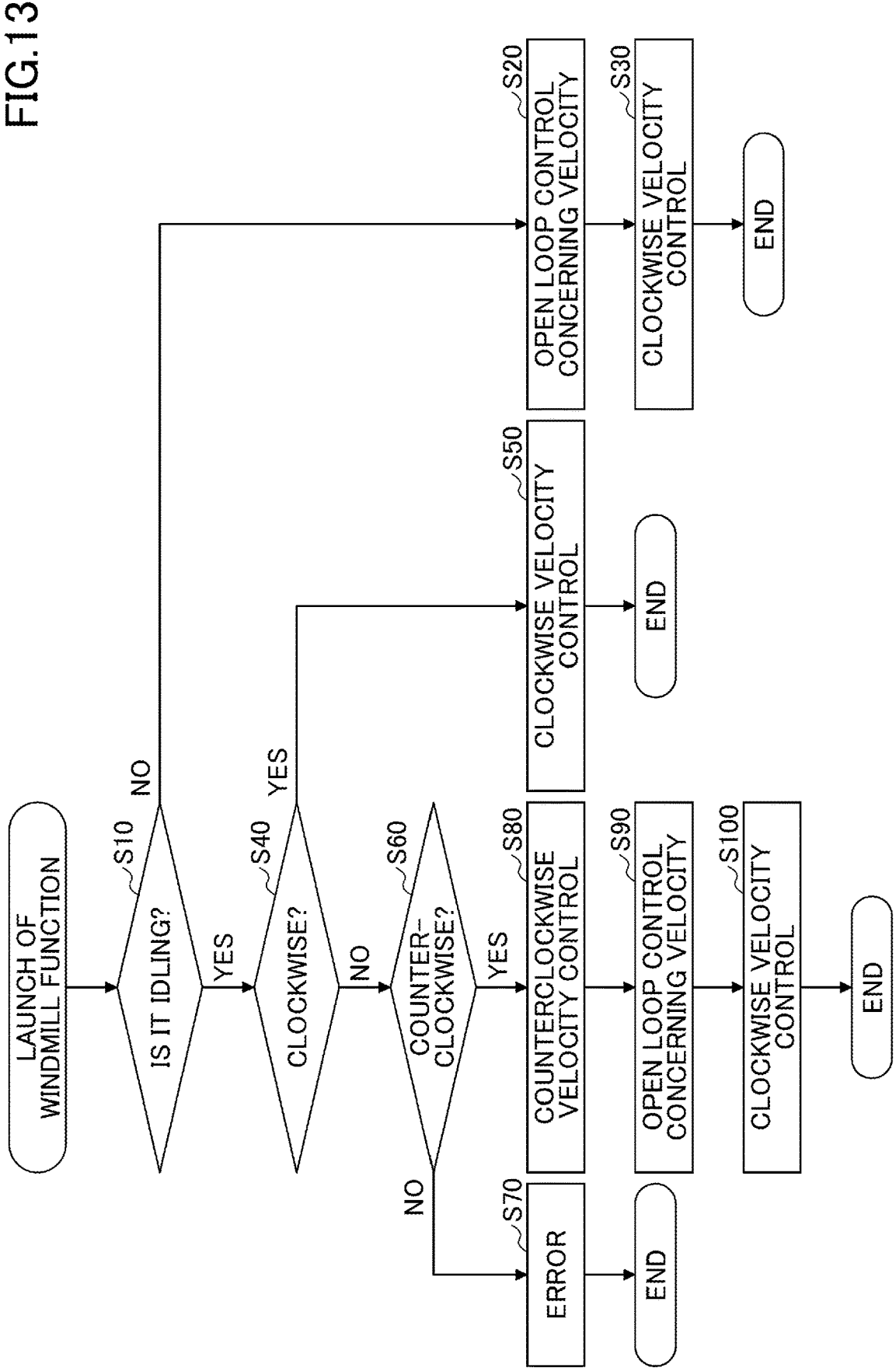
FIG. 13 is a flowchart illustrating an example of the process implemented by a windmill start function.

FIG. 13 is a flowchart illustrating an example of the process implemented by the windmill start function. In addition to the first windmill start function, FIG. 13 is also applied to the second windmill start function.

The position-and-velocity estimating unit 45 determines whether the rotor is idling based on whether the phase difference Δθ varies (step S10). If variations in the phase difference Δθ do not show any sawtooth waveform, the position-and-velocity estimating unit 45 determines that the rotor is stopped (NO in step S10). In this case, after performing inductive sensing, the vector control unit 30 performs open loop control concerning velocity (step S20), and performs velocity control in which the rotor rotates in a clockwise direction (step S30). In contrast, if variations in the phase difference Δθ show the sawtooth waveform, the position-and-velocity estimating unit 45 determines that the rotor is idling (YES in step S10). In this case, the position-and-velocity estimating unit 45 estimates the idling direction of the rotor, from the phase difference Δθ (steps S40 and S60).

Clockwise means a rotation state in which rotation is performed in an intended direction (commanded rotation direction), and counterclockwise means a rotation state in which rotation is performed in a direction opposite to the intended direction (commanded rotation direction). Clockwise idling refers to a state in which idling is performed in an intended rotation direction (commanded rotation direction), and counterclockwise idling refers to a state in which idling is performed in a direction opposite to the intended rotation direction (commanded rotation direction).

If it is determined that the idling direction of the rotor is a clockwise direction (YES in step S40), the position-and-velocity estimating unit 45 estimates an idling position and an idle velocity, by using a given windmill start function. The vector control unit 30 uses an estimated value of each of the idling position and the idle velocity, as an initial value to performs velocity control in which the rotor rotates in the clockwise direction (step S50).

If it is determined that the idling direction of the rotor is neither a clockwise direction nor a counterclockwise direction (NO in step S60), the position-and-velocity estimating unit 45 externally outputs error information indicating an abnormality (step S70).

If it is determined that the idling direction of the rotor is a counterclockwise direction (YES in step S60), the position-and-velocity estimating unit 45 estimates an idling position and an idle velocity, by using the windmill start function. With use of an estimated value of each of the idling position and the idle velocity as an initial value, the vector control unit 30 performs velocity control in which the rotor rotates in the counterclockwise direction, to thereby decelerate the rotor (step S80). Thereafter, the vector control unit 30 performs open loop control concerning velocity (step S90), and then performs velocity control in which the rotor rotates in the clockwise direction (step S100).

By performing such control, even when idling is performed in the clockwise direction or the counterclockwise direction, start-up is enabled smoothly in a desired direction.

<Second Windmill Start Function>

The process implemented by the second windmill start function will be described with reference to FIGS. 8, 14, and 15.

In the second windmill start function, as described with reference to FIG. 8, when a method of estimating the phase difference $\Delta\theta$ is performed as in the first windmill start function, it is sufficient. In the second windmill start function, the phase difference $\Delta\theta$ estimated by the observer 48 is input to the pole position estimation system 50 (see FIG. 14) of the position-and-velocity estimating unit 45. When the estimated phase difference $\Delta\theta$ is input to the pole position estimation system 50 of the position-and-velocity estimating unit 45, the pole position estimation system 50 adjusts the estimated pole position $\theta_m$ and the velocity estimate $\omega_m$ such that the phase difference $\Delta\theta$ becomes 0, and then outputs the pole position and velocity estimate.

Figure 14:
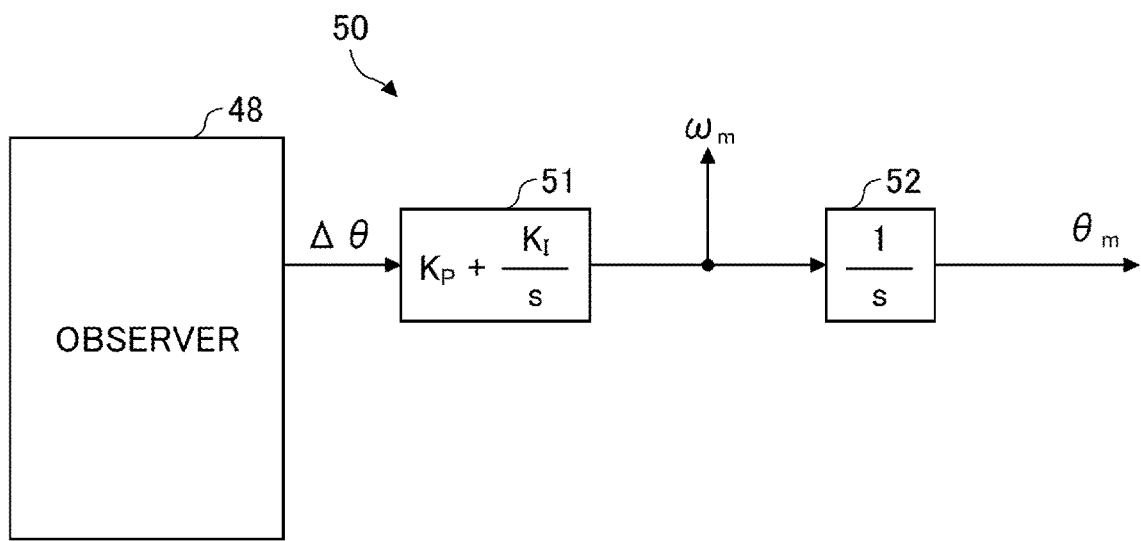
FIG. 14 is a block diagram illustrating an example of a pole position estimation system.

FIG. 14 is a block diagram illustrating an example of the pole position estimation system. The pole position estimation system 50 of the position-and-velocity estimating unit 45 derives the idle velocity (velocity estimate $\omega_m$) of the rotor from the phase difference $\Delta\theta$, through proportional-integral control 51, and estimates the pole position (estimated pole position $\theta_m$) during the idle time of the rotor, from the derived velocity estimate $\omega_m$, through the integral control 52. In FIG. 14, $K_p$ represents a proportional gain, $K_I$ represents an integral gain, and s represents a Laplace operator.

Before operating the pole position estimation system 50, the position-and-velocity estimating unit 45 derives the estimated pole position $\theta_m$ of the rotor during the idle time, from the relationship among the phase difference $\Delta\theta$ derived by the observer 48, the sign of the γ-axis electromotive force $e_\gamma$ estimated by the first observer 46, and the δ-axis electromotive force $e_\delta$ estimated by the second observer 47. The position-and-velocity estimating unit 45 then inputs, to the proportional-integral control 51, the phase difference $\Delta\theta$ obtained when the derived estimated pole position $\theta_m$ is 0, thereby operating the pole position estimation system 50 to perform the proportional-integral control 51 and the integral control 52. With this arrangement, hunting of the current flowing through the motor 4 can be suppressed.

After operating the pole position estimation system 50, the position-and-velocity estimating unit 45 causes the vector control unit 30 to perform velocity control at a timing at which the velocity estimate $\omega_m$ and the estimated pole position $\theta_m$, which are each the output of the pole position estimation system 50, become stabilized. With this arrangement, smooth start-up of the motor, during the idle time of the rotor, can be performed. Such a timing at which the velocity estimate $\omega_m$ and the estimated pole position $\theta_m$, are stabilized is dependent on gain of the proportional-integral control 51 and the integral control 52.

Figure 15:
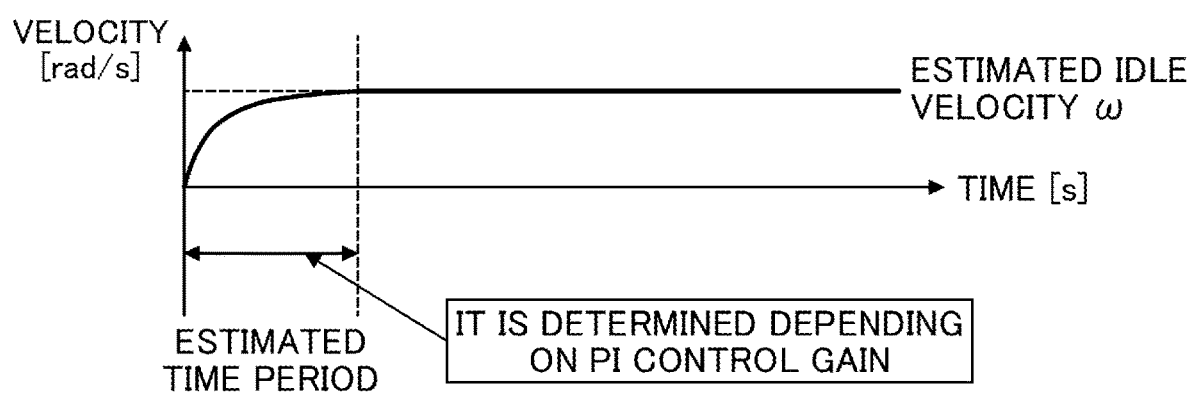
FIG. 15 is a timing chart illustrating an estimated time period required for a velocity estimate to be stabilized.

FIG. 15 is a timing chart illustrating an estimated time period required for the velocity estimate $\omega_m$, to be stabilized. A start timing of the velocity control by the velocity controller (velocity control system) of the vector control unit 30 is obtained after the estimated velocity time period, which is determined depending on the gain of the proportional-integral control 51 and the integral control 52. The position-and-velocity estimating unit 45 inputs a given estimated value of the idle velocity, as an initial value of each of the rotation speed command wref and the velocity estimate $\omega_m$, that are used at the velocity controller of the vector control unit 30. With this arrangement, the vector control unit 30 can perform sensorless vector control while smoothly moving the idling rotor, and thus can perform velocity control of the rotor.

Functions of the current detector 27, the energization pattern generator 35, the current detection-timing adjusting unit 34, and the initial-position estimating unit 38 are implemented by a central processing unit (CPU) that operates with a program that is readably stored in a storage device not illustrated. For example, the above functions are implemented by cooperation of hardware and software in a microcomputer including the CPU.

Although the motor controller, the motor system, and the method for controlling a motor have been described using the embodiments, the present invention is not limited to the above embodiments. Various modifications and improvements, such as combinations or replacements of a portion or entirety of any other embodiments, can be made within a scope of the present invention.

For example, the current detector, which outputs a detected signal corresponding to the magnitude of the current flowing into the DC side of the inverter, may be a detector that outputs a detected signal corresponding to the magnitude of the current flowing into the positive-side bus. The current detector may be a sensor such as a current transformer (CT).

This international application claims priority to Japanese Patent Application No. 2020-064146, filed Mar. 31, 2020, the contents of which are incorporated herein by reference in their entirety.

REFERENCE SIGNS LIST 1-1 motor system
4 motor
21 DC power source
22a positive-side bus
22b negative-side bus
23 inverter
24 current detection unit
27 current detector
30 vector control unit
32 PWM signal generator
33 drive circuit
34 current detection-timing adjustment unit
35 energization pattern generator
36 clock generator
37 carrier generator
38 initial-position estimating unit
45 position-and-velocity estimating unit
46 first observer
47 second observer 48 observer
50 pole-position estimation system
51 proportional-integral control
52 integral control
100-1 motor controller
Up, Vp, Wp, Un, Vn, Wn arm

The invention claimed is:

1. A motor controller comprising:
a derivation unit configured to estimate a γ-axis electromotive force and a δ-axis electromotive force, during an idle time of a rotor of a motor, and to derive a phase difference between dq axes and γδ axes, from the γ-axis electromotive force and the δ-axis electromotive force; and
an estimation unit configured to estimate an idling state of the rotor from the phase difference,
wherein the phase difference between the dq axes and the γδ axes has a periodic linear increase or decrease, and
wherein the estimation unit is configured to estimate an idle velocity of the rotor based on the phase difference having the periodic linear increase or decrease.

2. The motor controller according to claim 1, wherein the estimation unit is configured to estimate a pole position of the rotor during the idle time, from the phase difference, a sign of the γ-axis electromotive force, and a sign of the δ-axis electromotive force.

3. The motor controller according to claim 2, further comprising a vector control unit configured to use, as an initial value, the idle velocity that is obtained upon occurrence of a condition in which the pole position is 0, to perform velocity control of the rotor.

4. The motor controller according to claim 2, further comprising a vector control unit configured to perform velocity control of the rotor upon occurrence of a condition in which the pole position estimated by the estimation unit is 0.

5. The motor controller according to claim 1, wherein the estimation unit is configured to estimate orientation of the rotor during the idle time, based on the periodic linear increase or decrease of the phase difference.

6. The motor controller according to claim 1, wherein the estimation unit is configured to estimate, from the phase difference, the idle velocity of the rotor by proportional-integral control, and to estimate, from the estimated idle velocity, a pole position of the rotor during the idle time, by integral control.

7. The motor controller according to claim 6, wherein the estimation unit is configured to estimate the pole position from the phase difference, a sign of the γ-axis electromotive force, and a sign of the δ-axis electromotive force, and to perform the proportional-integral control upon occurrence of a condition in which the pole position is 0.

8. The motor controller according to claim 6, further comprising a vector control unit configured to use, as an initial value, the idle velocity estimated by the estimation unit to perform velocity control of the rotor.

9. The motor controller according to claim 1, wherein the γ-axis electromotive force and the δ-axis electromotive force are estimated by an observer.

10. A motor system comprising:
the motor controller according to claim 1; and
the motor.

11. A method for controlling a motor, performed by a motor controller that energizes a motor with a rotor, the method comprising:
estimating a γ-axis electromotive force and a δ-axis electromotive force, during an idle time of the rotor; and
deriving a phase difference between dq axes and γδ axes, from the γ-axis electromotive force and the δ-axis electromotive force; and
estimating an idle state of the rotor from the phase difference,
wherein the phase difference between the dq axes and the γδ axes has a periodic linear increase or decrease, and
wherein the estimating includes estimating an idle velocity of the rotor based on the phase difference having the periodic linear increase or decrease.

12. A motor controller comprising:
a derivation unit configured to estimate a γ-axis electromotive force and a δ-axis electromotive force, during an idle time of a rotor of a motor, and to derive a phase difference between dq axes and γδ axes, from the γ-axis electromotive force and the δ-axis electromotive force; and
an estimation unit configured to estimate an idling state of the rotor from the phase difference,
wherein the estimation unit is configured to
detect a change in each of a sign of the γ-axis electromotive force and a sign of the δ-axis electromotive force, and
estimate a pole position of the rotor during the idle time based on (i) the change in each of the sign of the γ-axis electromotive force and the sign of the δ-axis electromotive force and (ii) the phase difference that is zero degrees.

13. A motor controller comprising:
a derivation unit configured to estimate a γ-axis electromotive force and a δ-axis electromotive force, during an idle time of a rotor of a motor, and to derive a phase difference between dq axes and γδ axes, from the γ-axis electromotive force and the δ-axis electromotive force; and
an estimation unit configured to estimate an idling state of the rotor from the phase difference,
wherein the estimation unit is configured to detect a gradual increase or a gradual decrease in the phase difference, and estimate orientation of the rotor based on a result of detection.

* * * * *